United States Patent Office 3,090,221
Patented May 21, 1963

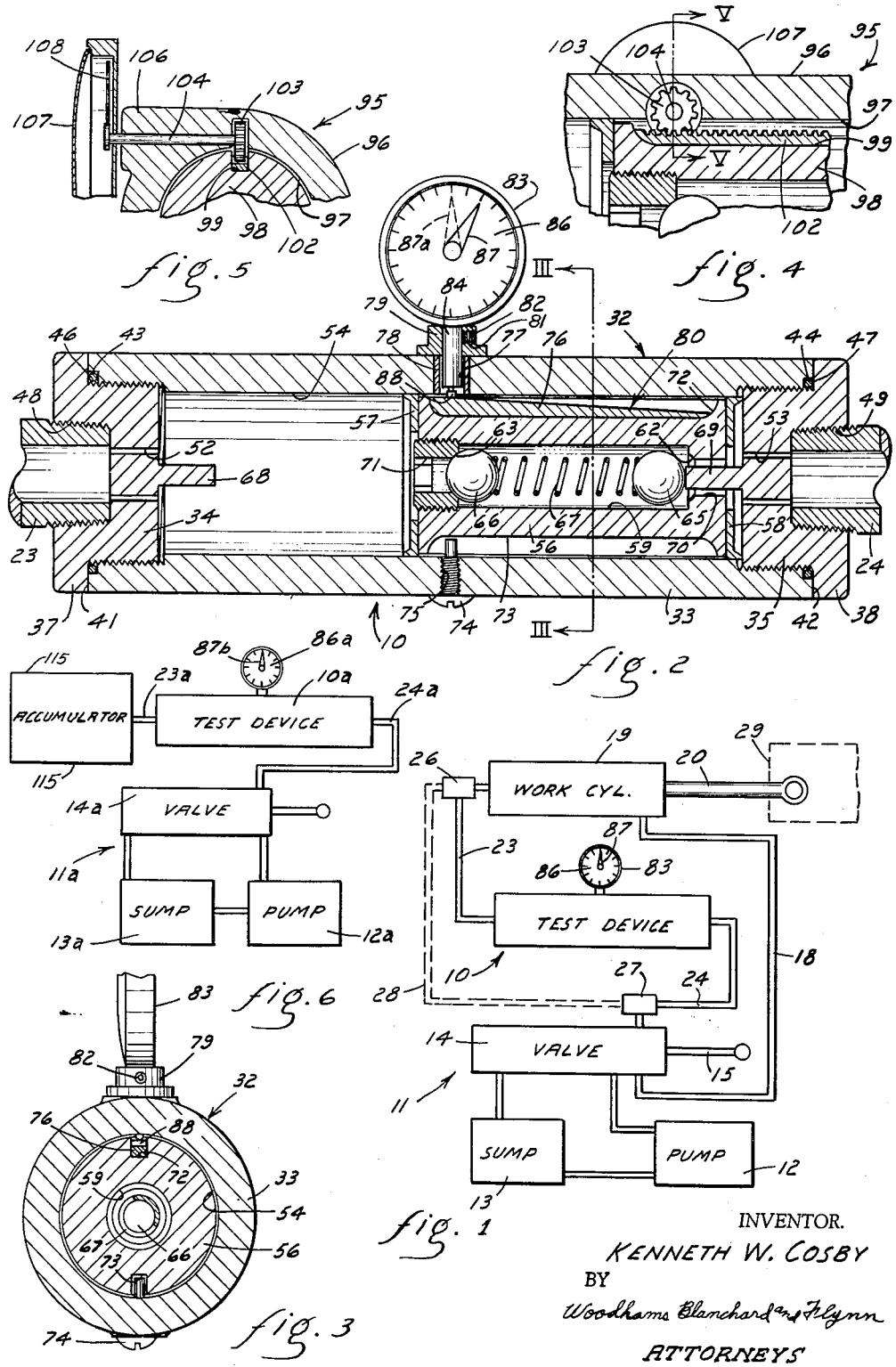

3,090,221
TEST APPARATUS AND HYDRAULIC SYSTEMS
Kenneth W. Cosby, Kalamazoo, Mich., assignor to
Carl J. Philipps, Kalamazoo County, Mich.
Filed Nov. 14, 1960, Ser. No. 69,226
4 Claims. (Cl. 73—40)

This invention relates in general to a test device and, more specifically, to a type thereof which can be quickly connected into a pressure fluid operated system for the purpose of detecting leaks in said system and determining the extent and location of said leaks.

It is a well-known fact that internal leaks in a hydraulic system are often difficult to detect and, in many instances, are much more difficult to locate, even in a simple hydraulic system involving a pump, a control valve and a hydraulic cylinder for the purpose of applying a continuous force. This type of leak usually results from the failure of an internal seal and becomes apparent only when the equipment operates sluggishly or not at all. If the leak develops while the equipment is being operated in the field, it is often necessary to disconnect from the system all of the component parts which are concerned, such as the cylinders, the valves and the pump, and transport them to a shop where they can be checked by appropriate instruments. Usually, the equipment is inoperative for at least one full day during such testing, which can be very costly to the equipment operator, particularly where time and continuous operation of the equipment are material factors.

The existing alternative procedure is to remove and replace, one at a time, each component part which may be leaking and by a process of elimination eventually locate the defective part. However, trial and error testing has not been satisfactory for a variety of reasons, particularly in large or complicated hydraulic systems, such as those found in earth moving equipment, for example. In the first place, two or more component parts may, and often do, fail at the same time. Thus, the leak cannot be stopped until each defective component is detected and replaced, which may necessitate the removal and concurrent replacement of several, duplicate component parts. This is not only a time-consuming operation, but also requires a large and costly inventory of replacement parts which must be transported with the equipment, and this is not feasible in most instances.

The same problem exists to a lesser degree in factories where inspection tests are conducted upon the hydraulic systems of assembled machines in order to determine their serviceability before shipment to users. That is, the leak may be detected during an inspection test, but not located without removing and checking individually each component which might be causing the leak. Thus, the need for a device whereby leaks in hydraulic systems can be quickly detected and easily located has been clearly evident, both for on-the-job testing and for inspection testing.

Temperature control has been a very serious problem in the use of existing test devices for determining leaks in various components of hydraulic systems. That is, most devices presently used for testing hydraulic systems or their parts either require compensation for temperature changes or, as is often the case, must be used under conditions where the temperature is reasonably close to some predetermined value, such as normal room temperature. This is mainly due to the fact that such existing test equipment depends for its accurate operation upon the condition of the hydraulic fluid. It is well known that both the viscosity and volume of such fluid will change with the temperature, which cannot be ignored if accurate measurements are desired. Where, for example, the test instrument relies upon a metered flow of fluid to determine the amount of leakage, a serious leak may appear inconsequential at a low ambient temperature, and a minor leak may appear serious at a warm ambient temperature. Variations in the barometric pressure and density of the atmosphere also affect adversely the operation of many of these test devices. Accordingly, existing devices for field testing hydraulic systems are not reliable under abnormal weather conditions. It follows that there is a real need for a test device in which the viscosity and temperature of the fluid being tested and the ambient temperature and pressure have no material bearing upon the conduct of the test.

Accordingly, a primary object of this invention has been the provision of a test device whereby leaks in a hydraulic system can be quickly detected and accurately located without removing the operating components of the system and without using special equipment or tools beyond the test device itself, and wherein the seriousness of the leakage can be determined, at least approximately.

A further object of this invention has been the provision of a test device, as aforesaid, which is extremely accurate in its determinations, which is completely portable, which can be used as effectively on the job site by unskilled persons as it can be in the factory by skilled inspectors and which can be used to rest individual components as well as to detect the one of several components in a system which is not operating properly.

A further object of this invention has been the provision of a test device, as aforesaid, which will operate as effectively with liquids of high viscosity as it will with liquids of low viscosity, thereby eliminating the need for temperature control during the testing operation, and which will detect and locate leaks in both gas and liquid operated systems.

A further object of this invention has been the provision of a test device, as aforesaid, wherein a variety of different types of indicators may be utilized as a part of the test device while employing the same basic principles of operation, and wherein the pressure can be safely dissipated on both sides of the test device by normal operation of the control mechanisms in the system being tested, prior to disconnection of the test device from the system.

Other objects and purposes of this invention will become apparent to persons familiar with this type of equipment upon reading the following specification and examining the accompanying drawings, in which:

FIGURE 1 is a diagrammatic illustration of a hydraulic system including a test device embodying the invention.

FIGURE 2 is a central cross-sectional view of said test device.

FIGURE 3 is a sectional view taken along the line III—III in FIGURE 2.

FIGURE 4 is a fragment of FIGURE 2 illustrating a modified construction.

FIGURE 5 is a sectional view taken along the line V—V in FIGURE 4.

FIGURE 6 is a diagrammatic illustration of a modified system with which said test device may be used.

For convenience in description, the terms "upper," "lower" and derivatives thereof will have reference to the test device and parts thereof as appearing in FIGURES 2 and 3. The terms "inner," "outer" and derivatives thereof will have reference to the geometric center of said test device and parts associated therewith.

*General Description*

The objects and purposes of the invention, including those set forth above, have been met by providing a test device comprised of a housing defining an elongated chamber having a uniform cross section throughout its length. A pair of conduits are connected to said housing and communicate with the opposite ends of said chamber. A floating piston is snugly and slidably disposed within said chamber for movement lengthwise thereof and has a central passageway communicating at its opposite ends with said chamber. Normally closed valve mechanism is provided within said passageway for preventing the flow of pressure fluid therethrough in either direction. Valve operators are disposed at opposite ends of the chamber for opening the valve mechanism as it approaches one end or the other of the chamber, whereby pressure fluid can flow through the passageway in said piston toward the end of said chamber being approached, but not in the opposite direction.

An indicating device is mounted upon the housing and has means capable of registering movement of the piston lengthwise of the chamber. The conduits are connected to the housing by means of quick disconnect couplings, whereby the test device can be easily and quickly connected into a hydraulic system for the purpose of testing same.

*Detailed Construction*

The test device 10 (FIGURES 1 and 2), which discloses a preferred embodiment of the invention, is shown herein for illustrative purposes as connected into a hydraulic system 11. Said hydraulic system includes in series connection, a pump 12, a sump 13 and a control valve 14, which is manually operated by the handle 15 in this particular embodiment. The pump 12 may be of the conventional positive displacement type and the control valve 14 may be of the conventional multiple port type. The valve 14 is connected through a conduit 18 to one end of a hydraulic cylinder 19 having an actuating arm 20. The other end of the hydraulic cylinder 19 is connected through a conduit 23 to one end of the test device 10, the other end of which is connected by the conduit 24 to the valve 14. Quick disconnect couplings 26 and 27 of substantially conventional types are provided in the conduits 23 and 24, respectively, adjacent to the hydraulic cylinder 19 and the valve 14 so that the test device 10 and its conduits 23 and 24 may be quickly replaced by the conduit 28 which normally connects the valve 14 to the hydraulic cylinder 19 when a test operation is not being performed. The actuating arm 20 may be connected to any conventional piece of equipment indicated in broken lines at 29, which is normally operated by a hydraulic cylinder.

The test device 10 (FIGURE 2) is comprised of an elongated cylindrical housing 32 including a hollow, cylindrical side wall 33 which is internally threaded adjacent to its opposite axial ends. A pair of circular end caps 34 and 35 which may be substantially identical, have external, radial flanges 37 and 38, respectively, adjacent to one axial end of each. Said end caps are externally threaded for reception into the threaded ends of said side wall 33 until said flanges 37 and 38 abut the opposite axial ends 41 and 42, respectively, of the side wall 33. The axial ends of the side wall 33 are counterbored to provide the annular recesses 43 and 44 in the end walls 41 and 42, respectively. Sealing means, such as the O-rings 46 and 47, are disposed within the recesses 43 and 44, respectively, for sealing the space between the ends 41 and 42 of the side wall 33 and the end caps 34 and 35.

The end caps 34 and 35 (FIGURE 2) have substantially coaxial, threaded recesses 48 and 49 in their opposite ends into which the threaded ends of the conduit 23 and 24 are threadedly received. Suitable sealing means, including pipe type threads, may be provided to make this connection fluid tight. Fluid openings 52 and 53 are provided through the end caps 34 and 35, respectively, to communicate between the recesses 48 and 49, respectively, and the elongated cylindrical chamber 54 defined by the side wall 33 and the end caps 34 and 35. It will be apparent that the chamber 54 may be other than circular in cross section providing its cross-sectional countour is substantially uniform throughout its length.

A floating piston 56, which has cup seals 57 and 58 at its opposite ends, is slidably disposed within the chamber 54 for movement lengthwise thereof. The piston 56, which is somewhat longer than half of the axial length of the chamber 54, has a central, preferably coaxial passageway 59 therethrough. The passageway 59 has a portion of reduced diameter at one end thereof, which provides the valve seat 62. The other end of said passageway 59 is internally threaded for reception of an annular, externally threaded valve seat 63. Cup seals 57 and 58 have central openings so that they do not obstruct the opposite ends of the passageway 59. A pair of check valves, which may be in the form of the valve balls 65 and 66, are disposed within the passageway 59 between the valve seats 62 and 63, respectively. Resilient means, such as the spiral spring 67, is held under compression between the valve balls 65 and 66, whereby they are continuously urged against their respective seats 62 and 63.

A pair of preferably coaxial and integral projections 68 and 69 extend from the end caps 34 and 35 toward each other into the chamber 54. Said projections 68 and 69 are preferably circular in cross-section and are smaller in outside diameter than the diameter of the reduced portions 70 and 71 of said passageway 59 through the seats 62 and 63, so that they are loosely received into the adjacent end portions of said passageway 59 when the piston 56 is close to the appropriate end cap 34 or 35. The length of said projections 68 and 69 is such that they will engage and unseat the respective valve balls 66 and 65, respectively, as the piston approaches their respective end caps and preferably just prior to engagement therebetween. Accordingly, the valve mechanism disposed within the passageway 59 is open to permit the flow of pressure fluid therethrough in the direction in which the piston is being moved, just before it engages the end cap 34 or 35 toward which it is being moved, whereby the pressure fluid in the opposite end of the chamber is released to prevent damage to the piston.

The piston 56 (FIGURES 2 and 3) is preferably cylindrical, but may have other cross-sectional contours, providing they do not interfere with its freedom of movement lengthwise of the chamber 54. Said piston 56 has a pair of lengthwise grooves 72 and 73 in the upper and lower sides thereof which extend between but are spaced from the opposite axial ends of the piston. A guide screw 74 is threadedly received through a radially disposed, threaded opening 75 in the lower-most portion of the side wall 33 so that the upper end thereof slidably extends into the lower groove 73. The screw 74 prevents the piston 56 from rotating around its central axis with respect to the housing 32, but does not obstruct its movement lengthwise of the chamber 54. The upper groove 72 contains an insert 76 which is wedge-shaped, as shown in FIGURE 2, so that its upper, control surface 80 converges with the central axis of the piston 56 from the leftward end toward the rightward end thereof. The control surface 80 is preferably disposed radially inwardly of the outer surface of the piston 56.

The side wall 33 has a radially disposed opening 77 which is diametrically disposed with respect to the screw opening 75 and contains a bushing 78. A locking collar 79, which is coaxial with and substantially equal in diameter to, the bushing 78, is secured to the outer surface of the side wall 33, and has a radially disposed threaded opening 81 for reception of a set screw 82.

An indicator or gauge 83, which may be of the type manufactured by the Federal Products Company of Providence, Rhode Island, and referred to as "Indicator, Model B81," has a hollow post 84 which is slidably received into the collar 79 and bushing 78, where it is firmly held by the set screw 82. The indicator 83 includes a dial face 86, a dial hand 87 and an anvil 88 which extends beyond the inner end of the post 84 and is connected to the dial hand 87 for effecting rotation thereof in response to movement of the anvil 88 lengthwise of the post 84. The inner end of the anvil 88 slidably engages the inclined surface 80 of the insert 76, so that lengthwise movement of the piston 56 effects said movement of the anvil 88 lengthwise of the post 84.

Although a particular make of indicator 83 has been specifically mentioned herein, other makes and types of indicators or gauges may be used as part of the test device 10. Moreover, as shown in FIGURE 4, the test device can be modified to provide an entirely different type of mechanism for actuating an indicator, without departing from the concept of the invention. The housing 32 (FIGURE 2) and most of the parts associated therewith, including the piston 56 and insert 76, are preferably fabricated from durable rigid materials, such as steel, brass, or the like.

As shown in FIGURE 4, the modified test device 95 includes a housing 96 defining a cylindrical chamber 97 containing a floating piston 98. The piston 98 has a lengthwise recess 99 in one side thereof containing a toothed insert or rack 102. A pinion 103 which engages the rack 102 for rotation thereby, is supported upon a shaft 104 which is rotatably supported in the housing 96 (FIGURE 5) and extends beyond said housing through a boss 106 integral therewith. An indicator 107, which is mounted upon the boss 106, has a hand 108 supported upon the shaft 104 for rotation thereby. A gear chain (not shown) may be provided between the shaft 104 and the indicator hand 108 in a conventional manner for establishing a selected ratio between the rotation of the pinion 103 and the hand 108. In other respects, the test device 95 may be substantially identical with the test device 10.

As shown in FIGURE 6, the test device 10a, which may be substantially identical to the test device 10, is connected by the conduits 23a and 24a between an accumulator 115 and a valve 14a similar to the valve 14 shown in FIGURE 1. By this arrangement, the test device 10a may be utilized to inspect for leakage in individual components, such as the control valve 14a.

Operation

The test device 10 (FIGURE 1) may be connected into a hydraulic system 11 by removing the conduit 28 between the hydraulic cylinder 19 and the control valve 14 and replacing it with the test device 10 and its conduits 23 and 24. The actual connection and disconnection of the conduits may be effected by means of the couplings 26 and 27 connected to and communicating with the cylinder 19 and valve 14, respectively. Ordinarily this change will be made when the valve 14 is in the neutral position and after the hydraulic cylinder 19 has been depressurized.

With test device 10 thus connected in the system 11, the handle 15 on the valve 14 is moved into a position where pressure fluid will flow from the pump 12 through the valve 14 and the conduit 24 into the rightward end of the chamber 54 (FIGURE 2). The pressure fluid enters through the rightward and 70 of passageway 59 and unseats the check valve 65, but the check valve 66 prevents said fluid from departing through the other end 71 of the passageway 59. Accordingly, the piston 56 is moved leftwardly through the chamber by the pressure fluid entering the rightward end thereof until it closely approaches the left end cap 34. At this point, the projection 68 enters through the valve seat 63 and opens the check valve 66, whereby the pressure fluid at the rightward end of the chamber can now move completely through the passageway 56 and through the conduit 23 to enter the hydraulic cylinder 19. During such leftward movement of the piston 56, the dial hand 87 moves in a clockwise direction, for example, from its solid line position to its broken line position 87a, which is the zero position in this particular embodiment. Such movement results from the slope in the insert 76 which permits the anvil 88 to move through the post 84 toward the central axis of the housing 32, upon which said post is mounted.

Pressure fluid continues to flow through the test device 10 (FIGURE 2) in a leftward direction until the actuating arm 20 (FIGURE 1) of the cylinder 19 has been moved into its extended position. The control handle 15 on the valve 14 is now moved into a neutral position, thereby presumably blocking the flow of pressure fluid through the valve 14. Where the hydraulic fluid is a liquid, the pressures within the conduits 23 and 24 become equalized substantially immediately on opposite sides of the piston 56, and the piston 56 will tend to remain substantially in its position adjacent to the end cap 34 when the valve 14 is neutralized. However, when the pressures are thus equalized, the spring 67 will urge the valve 66 toward the seated position and in so doing will cause a slight rightward movement of the piston, due to the engagement between the valve ball 66 and the adjacent projection 68.

If there is no leak in that portion of the hydraulic system 11 (FIGURE 1) including the hydraulic cylinder 19 and the neutral position of the valve 14, the dial hand 87 of the indicator 83 will remain on or near the zero position. However, if the hydraulic cylinder 19 is leaking so that hydraulic fluid can bypass the piston therein, a pressure drop will occur in the conduit 23 which will permit the actuating arm 20 to be moved back into the cylinder 19 by the load which it supports. Since the hydraulic fluid is by-passing the piston in the cylinder 19 and not flowing through the test device, there will be no reading on the indicator. Accordingly, the test operator can immediately determine that it is the hydraulic cylinder 19 which is leaking and by observing the speed with which the actuating arm 20 is moved into the hydraulic cylinder 19 can determine whether the leak is such as requires the replacement of the hydraulic cylinder.

On the other hand, if the valve 14 (FIGURE 1) is leaking, so that pressure fluid can flow from the conduit 24 through the valve into the sump 13, then the pressure within the conduit 24 will tend to drop below the pressure within the conduit 23. Accordingly, pressure fluid will attempt to flow from the conduit 23 through the chamber 54 to the conduit 24. Such flow through the passageway 59 will be blocked by the check valve 65. Thus, the piston 56 will be moved rightwardly in an effort to equalize the pressure on opposite sides thereof. However, the load on the actuating arm will tend to maintain the same pressure in the conduit 23 and, therefore, the piston 56 will continue to move rightwardly as long as the valve 14 continues to leak and the load remains on the cylinder 19.

Rightward movement of piston 56 causes the dial hand 87 to be moved away from its broken line position 87a in a counterclockwise direction around the dial face 86. This movement of the dial hand 87 can be timed to determine the seriousness of the leak. When the piston 56 closely approaches the rightward end of the chamber 54, the projection 69 enters into the rightward end 70 of the passageway 59 and unseats the valve 65, whereby the pressure fluid in the leftward end of the chamber 54 can now flow through the passageway 59 into the conduit 24 and thereby prevent damage to the piston 56.

Having determined that the leak is in either the hydraulic cylinder 19 or the valve 14, as the case may be, the control handle 15 of the valve 14 is moved into the dump position whereby the conduit 24 is connected through the valve 14 to the sump 13. Accordingly, the pressure fluid at the leftward end of the hydraulic cylinder 19 (FIGURE 1) can now freely move under the load imposed on the actuating arm 20 through the conduit 23, the passageway 59 of the test device 10, the conduit 24, and the valve 14 into said sump 13. It will be recognized that if the piston 56 is at the leftward end of the chamber 54 when the control handle 15 is moved into the dump position, it will move rightwardly through the chamber 54, as described above, until the right check valve 65 is unseated, after which the pressure fluid can flow freely through the test device 10. Having depressurized the test device 10 and the conduits 23 and 24, disconnection of the test device system 11 can now be effected without any danger from the rapid escape of pressure fluid from within the test device and its conduits 23 and 24.

Where it becomes desirable to test individual components of a hydraulic system, such as the valve 14a in FIGURE 6, the test device 10a is connected between the valve 14a and an accumulator 115. The valve 14a is opened and pressure fluid is urged by the pump 12a through the valve 14a, the conduit 24a and the test device 10a into the accumulator 115 until the accumulator is charged to a selected pressure. The valve is then moved into its neutral position.

During the charging of the accumulator, the piston 56 (FIGURE 2) will move into its leftward position in much the same manner as it did in the above description with respect to the operations of the test device with the hydraulic cylinder 19. If there is a leak in the valve 14a, pressure fluid will enter the left end of the test device 10a (FIGURE 6) thereby moving its piston rightwardly and producing a corresponding movement of the dial hand 87b around the dial face 86a. If there is no leakage, the piston, hence the dial hand 87b will remain stationary.

Accordingly, although particular preferred embodiments of the invention have been disclosed above in detail for illustrative purposes, it will be understood that variations or modifications of such disclosure, which do not depart from the scope of the appended claims, are fully contemplated.

What is claimed is:

1. A device for detecting a pressure drop in one of two conduits, both of said conduits containing pressure fluid, comprising:
    housing means defining an elongated, substantially cylindrical chamber communicating at the opposite ends thereof with the two conduits;
    a cylindrical, floating piston disposed within said chamber for sliding movement lengthwise thereof, said piston having a passageway extending therethrough and communicating at its opposite ends with the opposite ends of said chamber;
    normally closed valve means within said passageway, whereby one end of said chamber is normally sealed from the other end thereof;
    first actuating means located at one end of said chamber for holding said valve means open when, and only when, said piston is closely adjacent said one end of said chamber, whereby said fluid can flow from the other end of said chamber through said passageway and into said one end of said chamber;
    second actuating means located at the other end of said chamber for holding said valve means open when, and only when, said piston is closely adjacent said other end of said chamber, whereby said fluid can flow from the one end of said chamber through said passageway and into said other end of said chamber;
    and indicator means responsive to substantial movement of said piston lengthwise of said chamber to indicate a pressure differential between said conduits without obstructing the fluid flow therebetween.

2. The structure of claim 1 wherein said valve means includes a pair of check valves located near the opposite ends of said passageway and sensed toward each other, and resilient means urging said check valves away from each other and into their closed positions;
    and wherein said actuating means includes a pair of pins secured to the opposite end walls of said chamber and extendable into said passageway for opening said check valves, respectively, as said piston closely approaches the ends of said chamber, whereby pressure fluid can flow through said passageway past the pin being approached by said piston.

3. A device for detecting a leak in a hydraulic system including a pair of conduits connected respectively to a work load and a source of pressure fluid, comprising:
    housing means defining an elongated cylindrical chamber and means respectively supporting said conduits upon the opposite ends of said housing means for communication with the opposite axial ends of said chamber;
    a floating piston disposed within said chamber for movement lengthwise thereof, said piston having a substantially coaxial passageway therethrough communicating between the opposite ends of said chamber;
    a pair of spaced check valves disposed within said passageway and sensed toward each other;
    resilient means holding said check valves in the closed position, whereby the flow of fluid through said passageway in both directions is positively prevented;
    a pair of projections extending into said chamber from the opposite ends thereof coaxially with said passageway, each projection being receivable into one end of said passage for unseating said check valve therein as said piston closely approaches the one end of said chamber, whereby said fluid can flow from the other end of said chamber through said passageway and into the one end of said chamber being approached;
    indicator means engageable with said piston and responsive to substantially any lengthwise movement thereof for detecting movement of said piston away from said one end of said chamber in response to a pressure drop in a conduit communicating with the other end of said chamber;
    a lengthwise groove in the outer surface of said piston and guide means fixed with respect to said housing and slidably extending into said groove, whereby rotation of said piston around its central axis is prevented.

4. The structure of claim 3 wherein the piston has an axial length in excess of half the axial length of said chamber.

References Cited in the file of this patent

UNITED STATES PATENTS

| | | |
|---|---|---|
| 1,598,455 | Smith | Aug. 31, 1926 |
| 2,210,081 | Humphrey | Aug. 6, 1940 |
| 2,329,828 | Clark | Sept. 21, 1943 |

FOREIGN PATENTS

| | | |
|---|---|---|
| 178,549 | Great Britain | Apr. 18, 1922 |
| 140,264 | Germany | Apr. 9, 1903 |